(12) United States Patent
Skultety-Betz et al.

(10) Patent No.: US 7,671,577 B2
(45) Date of Patent: Mar. 2, 2010

(54) METHOD FOR LOCATING OBJECTS ENCLOSED IN A MEDIUM, AND MEASURING DEVICE FOR CARRYING OUT THE METHOD

(75) Inventors: Uwe Skultety-Betz, Leinfelden-Echterdingen (DE); Bjoern Haase, Stuttgart (DE); Kai Renz, Leinfelden-Echterdingen (DE); Reiner Krapf, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 11/814,436

(22) PCT Filed: Mar. 14, 2006

(86) PCT No.: PCT/EP2006/060705

§ 371 (c)(1),
(2), (4) Date: Jul. 20, 2007

(87) PCT Pub. No.: WO2006/103164

PCT Pub. Date: Oct. 5, 2006

(65) Prior Publication Data

US 2008/0129276 A1    Jun. 5, 2008

(30) Foreign Application Priority Data

Apr. 1, 2005  (DE) .................. 10 2005 015 325

(51) Int. Cl.
*G01R 19/00*  (2006.01)

(52) U.S. Cl. ........................................................ 324/67
(58) Field of Classification Search ................. 324/326, 324/67
See application file for complete search history.

(56) References Cited

U.S. PATENT DOCUMENTS

| 4,847,552 A * | 7/1989 | Howard ........................ 324/67 |
| 4,853,617 A | 8/1989 | Douglas et al. |
| 4,859,931 A | 8/1989 | Yamashita et al. |
| 6,411,073 B1 * | 6/2002 | Fischer et al. .................. 324/66 |
| 6,664,918 B2 * | 12/2003 | Paradie et al. .................. 342/70 |
| 2003/0201783 A1 | 10/2003 | Steber et al. |

FOREIGN PATENT DOCUMENTS

DE          42 00 518       7/1993

\* cited by examiner

*Primary Examiner*—Vincent Q Nguyen
(74) *Attorney, Agent, or Firm*—Michael J. Striker

(57) ABSTRACT

A method for locating objects enclosed in a medium, comprising the steps of generating a measurement signal correlated with an enclosed object; using the generated measurement signal to produce a signal which represents a difference between at least a first state which is "object detected" and at least a second state which is "no object detected"; switching from the first state "object detected" to the second state "no object detected" if a magnitude of the measurement signal being measured currently falls below a previously measured local maximum value of the measurement signal by a predefined first percentage.

11 Claims, 5 Drawing Sheets

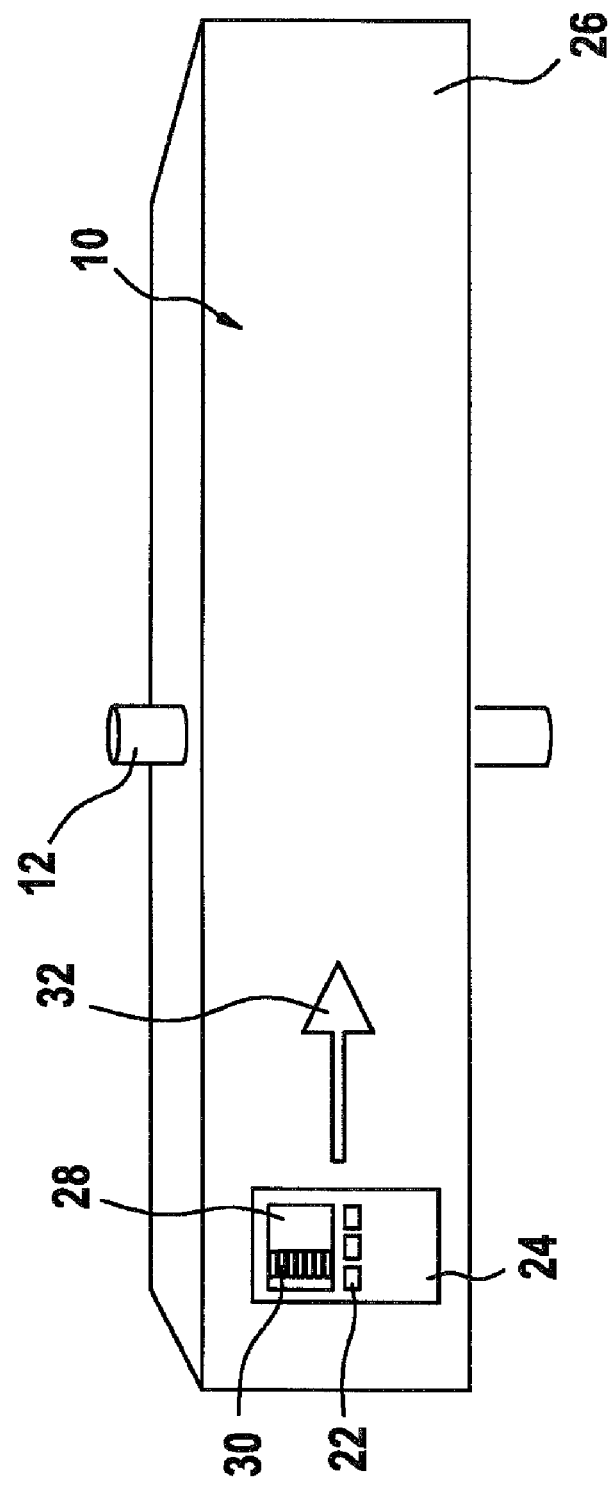

METHOD FOR LOCATING OBJECTS ENCLOSED IN A MEDIUM, AND MEASURING DEVICE FOR CARRYING OUT THE METHOD

CROSS-REFERENCE TO A RELATED APPLICATION

The invention described and claimed hereinbelow is also described in German Patent Application DE 10 2005 015 325.9 filed on Apr. 1, 2005. This German Patent Application provides the basis for a claim of priority of invention under 35 U.S.C. 119(a)-(d).

BACKGROUND OF THE INVENTION

The present invention relates to a method for locating objects enclosed in a medium, and a measuring device, particularly a hand-held locating device.

Locating devices have been used for a long time to detect objects—such as electrical cables, water lines, pipes, metallic framework or wooden beams—enclosed in a medium, e.g., in a wall, ceiling, or floor. These devices include inductive devices, i.e., devices that produce a magnetic field that is disturbed by the metallic objects enclosed in a medium. In addition to these inductive devices, capacitive devices, mains voltage detectors, and high-frequency detectors are also used. With mains voltage detectors or AC detectors, only a receiving conductor loop system is used to detect the desired signal and, therefore, to locate an object.

A problem associated with these devices in particular is the enormous dynamics of the sensors used that exists even though the measuring device has been calibrated; this results in a variation of the signal intensity of the measurement signal that is detected. In order to detect as many metallic objects of different sizes and embedded depth—i.e., the distance of the enclosed object from the measuring device—as possible using metal-locating devices, a large dynamic range must be covered. The large dynamic range of the measurement signal from sensors of this type results from the depth of the objects to be measured in the enclosing medium, and from the characteristic properties of the particular material to be detected. For example, the sensor signal or measurement signal generated by a copper cable located deep inside a wall is smaller— by several magnitudes—than that produced by an iron pipe located 2 cm inside the wall.

With many of the known locating devices, particularly metal-locating devices or mains-voltage locating devices, it is therefore often possible to manually adjust the sensitivity of the sensor, i.e., for the user to manually adjust the sensitivity of the sensor. Rotary potentiometers, e.g., with an associated rotating wheel installed on the housing of the locating device, are used for this purpose.

With other locating devices, the sensitivity of the sensor and, therefore, the intensity of the detected measurement signal, can be regulated by recalibrating the device for the objects that are present.

With devices of this type, however, it is difficult to detect and/or exactly locate objects of different sizes, e.g., copper cables and steel beams, with one device setting. If the signal intensity of the detected measurement signal is too great, for example, this results in overdrive of the receiving amplifier of a sensor of this type. It is so critical because, in this case, it is no longer possible to detect an increase or decrease in a signal over a wide range, although this must be done in order to locate an enclosed object exactly. In a case such as this, an enclosed object causes maximum deflection of the measuring device over a broad lateral range, so that the user is still uncertain as to the exact position of the object. Nor is it possible, e.g., to detect objects that are located close to each other as two separate objects.

Several proposed designs for detecting signals with large dynamics are known in the related art.

Publication DE 42 00 518 A1 makes known a metal detector with which metal hidden in a wall can be located and its depth determined using a sensor provided with two coil pairs. The two coil pairs of the sensor described in DE 4200518 A1 are each connected with an oscillator, and they oscillate continually at different frequencies. The signals, which are influenced by the metal, are measured and weighted for the evaluation. An intensity display on the measuring device characterizes the position of the metal for a user. To measure the depth of the hidden metal, i.e., to determine the depth of the enclosed object relative to the surface of a wall, a floor, or the like, a boosting device on the measuring device is actuated once the metal is located in order to boost the metal detector by a defined amount. The depth of the hidden metal is calculated by performing a second measurement and taking into consideration the predefined changed distance from the wall surface. A manually operated marking device makes it possible to characterize the location of the measurement and the enclosed object.

By weighting the signal that is received, the sensitivity of the measuring device described in DE 4200518 A1 can be adjusted automatically, thereby enabling the position of the hidden metal to be determined in a particularly precise manner.

SUMMARY OF THE INVENTION

Accordingly, it is an object of the present invention to provide a method for locating objects enclosed in a medium, which ensures that the objects can be located as accurately as possible.

This object is attained by the disclosed new method and the device.

With the inventive method for locating objects enclosed in a medium, a measurement signal that makes it possible to obtain information about the position of the enclosed object is generated. This signal is, e.g., a voltage induced in a receiving conductor loop system of a sensor of a measuring device that operates according to the inventive method. The relative signal strength can be used to locate and/or detect an enclosed object.

Based on the measurement signal—which contains information about the position of the enclosed object—obtained in this manner, an output signal is generated that makes it possible for a user of the inventive method or a measuring device that operates according to this method to distinguish between at least two detection states in the locating procedure. For instance, the inventive method generates a first signal, which corresponds to the state "object detected". By using a second signal, which is also generated based on the measurement signal, it is possible to differentiate from a second state, "no object detected".

Advantageously, with the inventive method, there is a switch from the first state, "object detected", to the second state, "no object detected", if the magnitude of the measurement signal currently being measured falls below a previously measured, local maximum value of the measurement signal by a predefined, first percentage.

Devices in the related art typically transmit the information that an object has been detected, if the measurement signal exceeds a predefined measurement signal threshold. As a result of a fixed measurement signal threshold of this type, an object cannot be detected if the measurement signal of an object is below this threshold. If an object has a very large measurement signal, however, with which this fixed measurement signal threshold is exceeded very early, that is, e.g., while still a great distance away from the object to be located, the object can be detected, but it cannot be located particularly accurately.

The inventive method limits the state "object detected"—which notifies a user that an object has been located—to a relative signal strength compared to a measurement signal maximum measured previously in the same measuring procedure. If a measurement signal maximum is detected that is typically associated with locating an enclosed object, the distance range assigned to the enclosed object that has been located, i.e., detected, is limited by the fact that the measurement signal that is measured falls below a defined percentage of the measurement signal maximum that was measured previously.

In this manner, it is possible to differentiate between objects located closely together, which—given a constant measurement signal threshold according to the methods in the related art—would result in a signal that would lie above the measurement signal threshold across the entire range of the two enclosed objects.

With the inventive method, it is advantageously ensured that objects enclosed in a medium can be located accurately.

In a particularly advantageous embodiment of the inventive method, as an alternative, there is a switch from the first state, "object detected", to the second state, "no object detected", if the magnitude of the measurement signal currently being measured exceeds a predefined, first threshold value, but without having fallen below the local maximum value of the measurement signal—which was measured previously—by the predefined, first percentage.

In this embodiment, the inventive method for locating objects preferably includes a relatively low first threshold value. Only above this threshold value can an object even be detected and, therefore, located.

In this embodiment, therefore, there is a switch from the state, "object detected", to the state, "no object detected", if the measurement signal falls below the first, fixed threshold value, or if the measurement signal has been reduced by a defined percentage of the most recently measured maximum value of the measurement signal, depending on which value is exceeded first in the measurement currently being carried out.

Advantageously, with the inventive method, there is a switch from the second state, "no object detected", to the first state, "no object detected", if the magnitude of the measurement signal currently being measured exceeds a previously measured, local minimum value of the measurement signal by a predefined, second percentage. With the inventive method, the state, "object detected" does not merely mean that a fixed measurement signal threshold has been exceeded, but also that an object has been identified and located, i.e., the method reports the state, "object detected", if a previously measured, local minimum of the measurement signal is exceeded by a predefined, second percentage. If the measurement signal therefore passes through a minimum and then increases, it can be assumed that this increase is due to another enclosed object. In this manner it is possible to locate closely adjacent, enclosed objects.

In a particularly advantageous embodiment of the inventive method, the predefined, first percentage is chosen to be greater than the predefined, second percentage. Since the percentage is smaller when the minimum value is exceeded than when the maximum value is fallen below, an object can be located much more accurately by moving over it repeatedly than would be possible if the object were moved over once. To this end, a user switches the moving device of a locating device implementing the inventive method precisely when a switch from the state, "object detected", to the state, "no object detected" is reported. Due to the different percentages that are assigned to the particular state change, the exact position of the maximum of the measurement signal can also be determined with great accuracy merely via the state signal, i.e., an indication of the signal strength is not required.

Using the inventive method, which makes it possible to more accurately locate enclosed objects, a user can locate enclosed objects very accurately simply by switching from the state, "object detected", or "no object detected", without needing to know the exact course of the measurement signal.

A measuring device that operates according to the inventive method now no longer displays the state "object detected" over a wide range of motion. In particular, the measuring range assigned to the located object becomes narrower and narrower, e.g., when the moving device of a measuring device is switched repeatedly.

In an embodiment of the inventive method, there is also a switch from the second state, "no object detected", to the first state, "object detected", as an alternative, when the magnitude of the measuring signal currently being measured exceeds a predefined, second threshold value, but without having exceeded the local minimum value of the measuring signal by the predefined, second percentage.

When a measuring procedure is restarted, e.g., there are no measured values and, in particular, no measured maximum or minimum values of the measurement signal. In a case such as this, the inventive method would switch from the second state, "no object detected", to the first state, "no object detected", if the magnitude of the measurement signal currently being measured exceeds the predefined, second threshold value.

Advantageously, with the inventive method, the first threshold value and the second threshold value are equal, so that the inventive method has a single constant, relatively low measurement signal threshold.

It is also advantageous that the measurement signal is measured as a function of a lateral displacement of a sensor. A sensor of this type can include, e.g., one or more transmission coils and a receiving conductor loop system. In alternative embodiments, a sensor of this type can include, e.g., only one receiving conductor loop system, so that alternating currents can be located, for example. A capacitive sensor, e.g., for detecting wooden beams, is also possible. These sensors can be integrated individually in a measuring device, or several of them can be combined in any combination to form a single measuring device. For example, a measuring device of this type designed according to the inventive method can be slid over a wall in order to locate objects, e.g., metal parts, power cables, or wooden beams, that are enclosed in this wall. A certain magnitude of a measurement signal is assigned to every position of the measuring device.

A measuring device of this type for implementing the inventive method, which can be designed as a hand-held locating device in particular, advantageously includes output means, which make it possible to depict the particular state that is measured, i.e., "object detected" or "no object detected". A separate output unit can be provided for every sensor, or the state signals from all sensors combined in the measuring device are output via a central output unit of the measuring device, e.g., a graphical display. An acoustic output is also possible. By depicting the particular state ("object detected" or "no object detected") of individual sensors, a user can therefore be notified as to whether the measuring device is positioned near an object that has been located, and what type of object it could be.

With an inventive measuring device, the particular state, "object detected" or "no objected detected", is advantageously depicted optically. The different states can be coded with different colors, for example. It is also possible to distinguishe between the different states by using a different repeat frequency of an optical signal.

In addition to an optical depiction of the states, an acoustic depiction is also possible, of course, e.g., a state having a different pitch or a different repeat frequency of the same tone. The inventive measuring device includes at least one sensor, which includes at least one receiving conductor loop system, e.g., a receiving coil. Further transmission or receiving coils and further sensors are also possible in other embodiments of the inventive measuring device. A sensor of this type is calibrated such that, when an object is located, a signal change that occurs when a device is moved relative to the object is measurable. With the inventive method and/or with a measuring device that implements the inventive method, e.g, a hand-held locating device, greater accuracy is provided for locating the object enclosed in a medium. Despite the very high dynamic range of the measurement signal generated by the sensor, the dynamic state assignment according to the inventive method makes it possible to locate the objects in an improved, accurate manner.

Using the inventive method, which makes it possible to more accurately locate enclosed objects, a user can locate enclosed objects very accurately simply by switching from the state, "object detected", or "no object detected", without needing to know the exact course of the measurement signal.

Further advantages of the inventive method and a measuring device for carrying out this method are indicated in the description, below, of an exemplary embodiment, and in the associated drawing.

An exemplary embodiment of the inventive method is depicted in the drawing, and it is described in greater detail in the subsequent description. The figures in the drawing, their descriptions, and the claims contain numerous features in combination. One skilled in the art will also consider the features individually and combine them to form other and further reasonable combinations.

BRIEF DESCRIPTION OF THE DRAWINGS

FIG. 1 shows a typical measurement situation for locating an object enclosed in a medium, in a schematicized depiction.

DESCRIPTION OF THE PREFERRED EMBODIMENTS

Figure 2A:
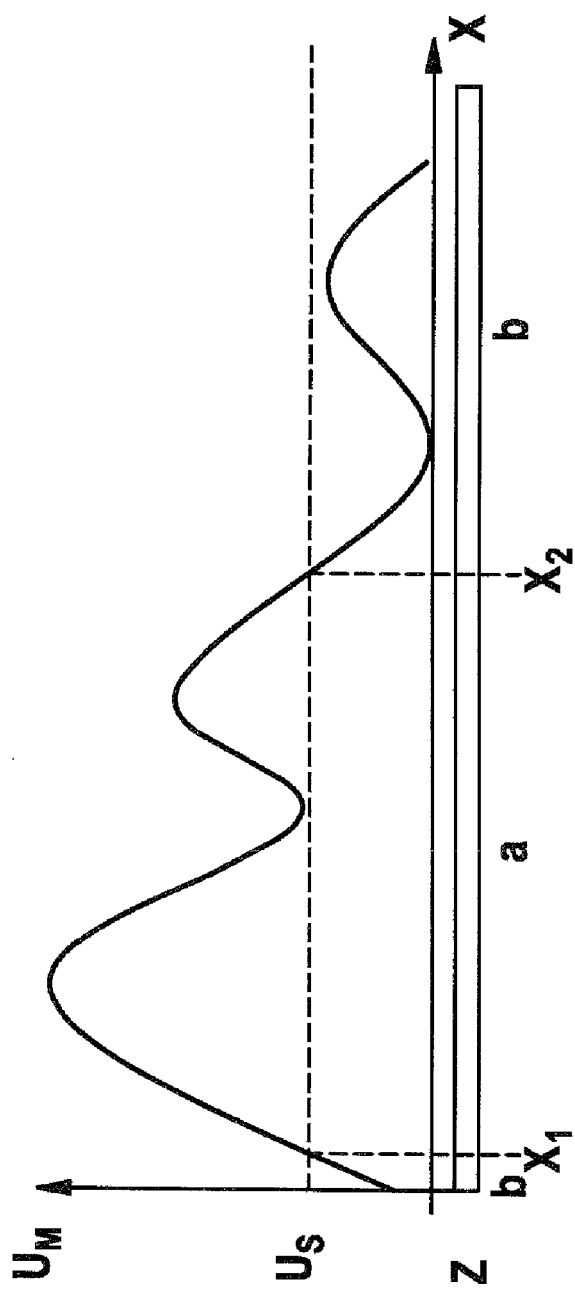
FIG. 2*a* shows a schematicized depiction of the graph of the detected measurement signal and the depicted state as a function of the location, when a method according to the related art is used.

FIG. 1 shows a typical measurement situation for locating objects enclosed in a medium 10, e.g., a wall, a floor, or a ceiling. A locating device 24 is moved along surface 26 of a medium 10 to be investigated in order to detect, i.e., locate, the position of an object 12 enclosed in medium 10. An object 12 of this type can be, e.g., an electrical cable, a pipe, e.g., a water pipe, metallic framework, or other objects, such as wooden beams. A locating device 24 of this type can include, in particular, an inductive sensor with at least one transmission coil and a receiving conductor loop system that serves as a receiving unit. A measuring device of this type can also be, e.g., a mains voltage detector, which only includes a receiving conductor loop system, e.g., a coil, as the sensor for detecting the measurement signal. The measuring device can also include a combination of various sensors.

If an object is now present in the vicinity of a receiving geometry, this object modifies the field generated by the transmission geometry so that a resultant flux is induced in the receiving coil. The flux induced in the receiving coil and/or a receiving conductor loop system can then be tapped as the measurement voltage, e.g., at the coil or downstream measuring amplifiers. The detected measurement signal, e.g., tapped measurement voltage $U_M$, is that much greater the closer the inductive sensor comes to the enclosed object.

When a locating device 24 of this type approaches an enclosed object 12, as would be the case, e.g., by moving it in the direction of arrow 32 shown in FIG. 1, the detected measurement signal increases.

With devices according to the related art in particular, measurement situations can now occur in the vicinity of enclosed object 12 in which the measurement signal is so strong across a greater displacement path of locating device 24 in the region of object 12 to be detected that the maximum deflection of the output quantity, e.g., tapped measurement voltage $U_M$, is displayed across the entire range. In this case it would not be possible to locate enclosed object 12 exactly. A locating device 24 of this type includes, in addition to control electronics, the associated energy supply and an evaluation unit for the detected measurement signal, e.g., a graphical display 28 that displays an output quantity that is correlated with the intensity of the detected measurement signal. The output quantity can be depicted, e.g., in the form of a bar diagram 30, in which the number of illuminated bars between a mininum value and a maximum value is a measure of the intensity of the measurement signal. In addition to the depiction of the output quantity using a bar diagram 30 as shown in FIG. 1, other output forms are possible, particularly further optical depictions. For example, state "object detected" or "no object detected" can be depicted using related illuminating elements 22.

FIG. 2*a* shows the graph of measurement signal $U_M$ and the possible depiction of states Z "object detected" and "no object detected" in a locating procedure described in the related art. The state "object detected" corresponds to range Z=a, and the state "no object detected" is labeled with Z=b in FIG. 2*a*.

Figure 2B:
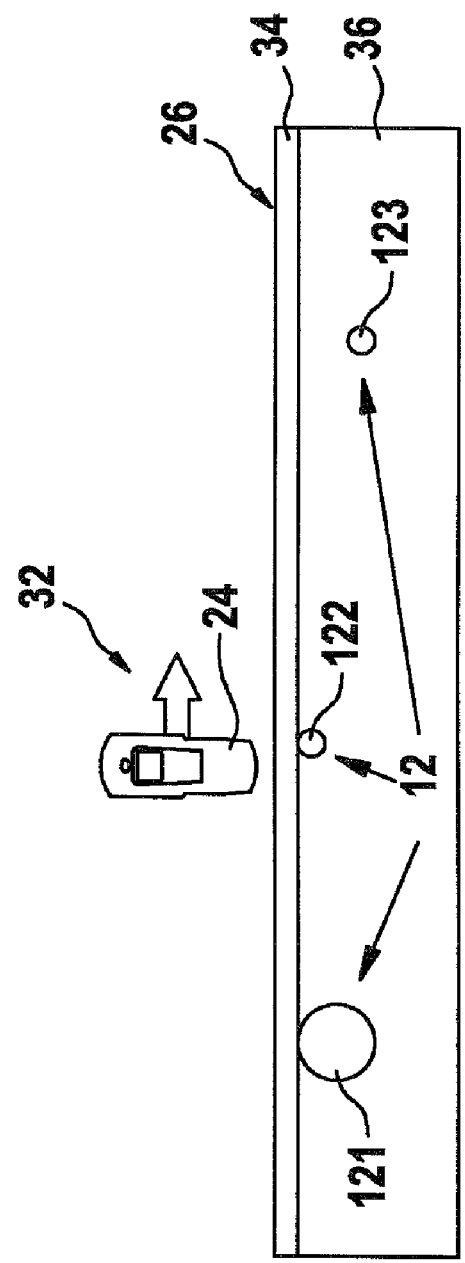
FIG. 2*b* shows the measurement situation on which the graph of the measurement signal in FIG. 2*a* is based, in a schematicized depiction.

The measurement situation on which this is based is depicted in FIG. 2*b*. Various objects 12, e.g., water lines, power lines, or the like, are enclosed in a medium 36. A locating device 24 is used to locate the position of these enclosed objects 12. To this end, locating device 24 is moved in the direction of arrow 32 over surface 26, e.g., of a wall 34. FIG. 2a shows the associated graph of measurement signal $U_M$, which can be, e.g., the voltage induced in a coil of the measuring device, as a function of lateral displacement X of measuring device 24 over surface 26 of the wall to be investigated.

If the measuring device with a sensor is still far from enclosed object 12, the related measurement signal is still weak. Measuring devices according to the related art usually have a detection threshold $U_S$. If the measurement signal of an object is below this threshold $U_S$, the object as such is not detected and can therefore not be located. In this case, a measuring device outputs information that reflects the state "no object detected" (Z=b). This state, "no object detected", exists in ranges b of lateral displacement path X in the measurement situation depicted in FIG. 2. If one approaches an object 12 enclosed in medium 36 with a measuring device 23, measurement signal $U_M$ increases. If measurement signal $U_M$ currently being measured exceeds measurement signal threshold $U_S$, state Z switches from "no object detected" (Z=b) to the state "object detected" (Z=a). With this, a user is notified that the measuring device has located an enclosed object.

In the methods according to the related art and depicted in FIG. 2, the state "object detected" is displayed across a wide lateral displacement path of measuring device 24, since the particular $U_M$ being measured is located in this entire range above detection threshold $U_S$. Using the method depicted in FIG. 2, in particular, it is not possible to detect that there are two separate enclosed objects 121 and 122, which contribute to the fact that measurement signal $U_M$ is located over a broad range above detection threshold $U_S$. It is not possible to locate objects 121 and 122 exactly using a method of that type.

Nor is it possible, using a method of that type, to locate an object 123 that generates a measurement signal $U_M$ that is located below the measurement signal threshold for object detection. If measurement signal $U_M$ currently being measured falls below measurement signal threshold $U_S$, as depicted at lateral position $X_2$ in FIG. 2a, the state "object detected" (Z=a) switches to the state "no object detected" (Z=b). Since measurement signal $U_M$ currently being measured also remains below measurement signal threshold $U_S$ as measuring device 34 is moved further, the second state "no object detected" is maintained across entire range b, even though object 123 induces a marked signal deflection of measurement signal $U_M$.

The method according to the related art and depicted in FIG. 2 therefore has the disadvantage that an object that generates a measurement signal that is below the measurement signal threshold cannot be detected as an object. If it is an object with a very large measuring signal, however, with which the measurement signal threshold is exceeded very early, that is, while still a great distance away from the object to be located, the object can be detected, but it cannot be located accurately, nor can different objects be differentiated.

Figure 3A:
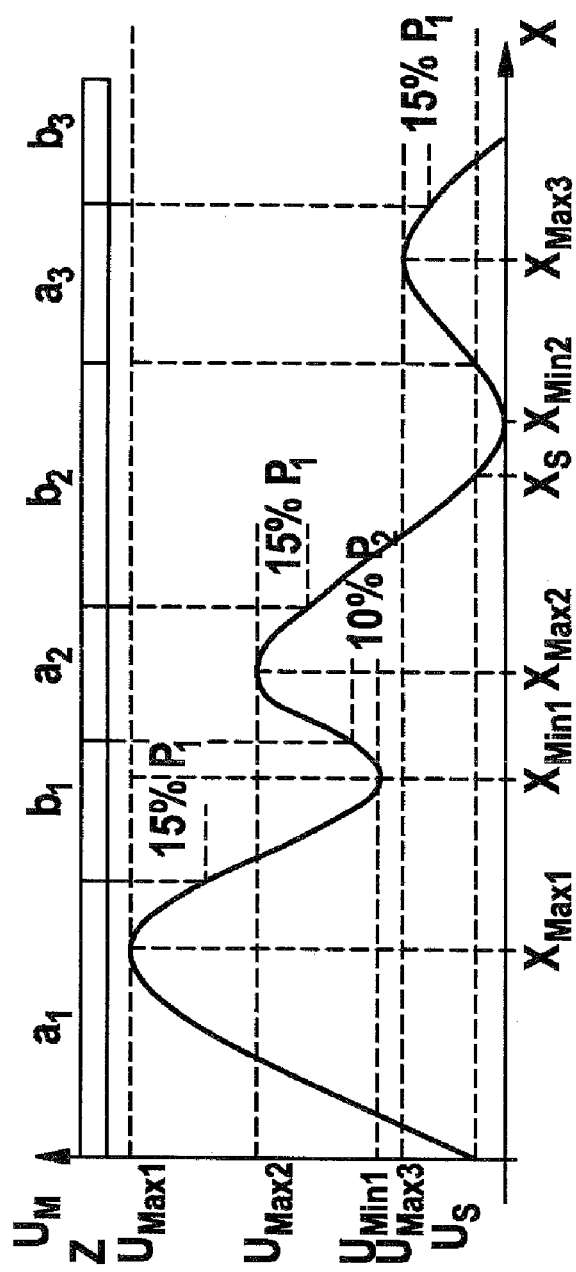
FIG. 3*a* shows a schematicized depiction of the graph of the detected measurement signal and the depicted state as a function of the location, when the inventive method is used.
Figure 3B:
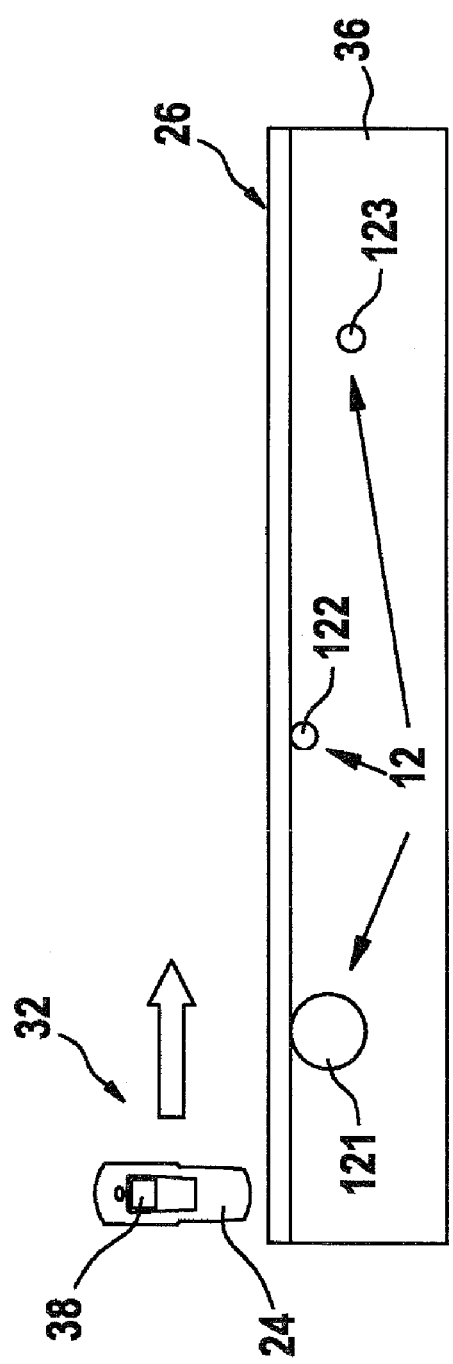
FIG. 3*b* shows the measurement situation on which the graph of the measurement signal in FIG. 3*a* is based, in a schematicized depiction.

FIGS. 3a and 3b depict the measurement situation in place when the inventive method is used. The measurement situation in FIG. 3b corresponds to the measurement situation in FIG. 2b. A measuring device 24 that operates according to the inventive method is slid in arrow direction 32 over surface 26 of a wall, a floor, or a ceiling. Objects 12, e.g., water lines, power lines, or wooden beams, are enclosed in medium 36.

FIG. 3a shows the graph of measurement signal $U_M$ detected by the measuring device, and a signal Z, which is generated based on measurement signal $U_M$, and which distinguishes between the two states "object detected" (state Z=a) and "no object detected" (state Z=b).

The inventive method for detecting and locating objects includes a relatively low fixed threshold $U_S$. In fact, it is only possible to detect an object as such above this threshold $U_S$. When the measuring device that operates according to the inventive method is slid in the direction of arrow 32 across surface 26, measurement signal $U_M$ currently being measured increases, as shown in FIG. 3a. If measurement signal $U_M$ currently being measured exceeds predefined measurement signal threshold $U_S$, a signal is generated that represents the state Z=a ("object detected"). This signal, Z=a, tells a user that an object has been located. To depict state Z=a or opposite state Z=b, the color signal of two different light-emitting diodes 38, which are integrated in measuring device 24 as output means, can be used, for example. When state Z switches from "object detected" (i.e., state Z=a) to a state "no object detected" (Z=b), it is possible, e.g., to switch from a red light-emitting diode to a green light-emitting diode, to signal to a user that he is no longer dealing with an enclosed object.

As measuring device 24 is moved further in the direction of arrow 32 in FIG. 3b, measurement signal $U_M$ increases further, and the state communicated to a user remains set at Z=a. At a position $x_{Max1}$, a first maximum value $U_{Max1}$ is reached for measurement signal $U_M$. The fact that the measurement signal is increasing can be communicated to a user, or not.

If, with the inventive method, current measurement signal $U_M$ decreases again—e.g., as the measuring device is slid further in arrow direction 21—by a predefined percentage compared with the most recently measured maximum value $U_{Max1}$, signal Z—which characterized the particular state of the system—switches from state a ("object detected") to state b ("no object detected"). Via the output of the measuring device a user is therefore notified that he has left the location of the object that was found. In the exemplary embodiment in FIG. 3a, there is a switch from state $Z=a_1$ to state $Z=b_1$ if measurement signal $U_M$ currently being measured has dropped of by 15% compared with maximum value $U_{Max1}$ measured previously. The value of 15% is only a typical, e.g., possible value, which is not intended in any way to represent a limitation. Other values are also possible. It is possible, in particular, to optimize this switchover threshold between state Z=a and state Z=b in different detection programs for a measuring device with regard for the different response behavior to enclosed objects due to their material composition. This first percentage $P_1$ can also be optimized depending on the sensor principle used (e.g., inductive sensor, capacitive sensor, AC sensor). It should be noted that this first percentage $P_1$, as a second percentage $P_2$ to be described below, is not an absolute value, but rather is based on the value of previously measured maximum value $U_{Max}$, and, in the case of percentage $P_2$, is based on a minimum value $U_{min}$ of measurement signal $U_M$. The particular signal change in measurement signal $U_M$, which is required to switch from a state Z=a to a state Z=b and vice versa, is therefore not absolute, but rather is dependent on the magnitude of the measurement signal that is present. In this manner, it is attained that even smaller measurement signals, e.g., from small objects such as an object 122, are generated or result from an object enclosed deeper in a medium, e.g., an object 123, are sufficiently delineated from a strong signal, as produced, e.g., by an object 121, so that these objects can be located individually.

When measuring device 24 is moved further in arrow direction 32 shown in FIG. 3b over object 121, measurement signal $U_M$ decreases further and reaches a minimum value $U_{Min1}$ at a point $x_{Min1}$. When the measuring device is slid further in arrow direction 32, the measurement signal increases again due to the effect of enclosed object 122 and reaches a lateral position $x_{Max2}$ at a second local maximum value $U_{max2}$. Position $x_{Max2}$ is identified as the exact position of enclosed object 122.

If measurement signal $U_M$ currently being measured increases, starting at previously detected minimum value $U_{Min1}$, by a predefined, second percentage, the inventive method switches state Z from the signal for $Z=b_1$ ("no object detected") to a state $Z=a_2$ ("object detected"). In the exemplary embodiment in FIG. 3a, second percentage $P_2$ is 10%; this 10% is intended to merely represent a typical value and is not intended to represent a limitation of any kind.

Advantageously, however, second percentage $P_2$ is chosen to be smaller than first percentage $P_1$, as will be explained further with reference to FIG. 4.

When the measuring device is moved past position $x_{Max2}$, measurement signal $U_M$ decreases as the distance from enclosed object 122 increases. If measurement signal $U_M$ currently being measured falls below the value of previously measured maximum $U_{Max2}$ by percentage $P_1$ (e.g., 15% in FIG. 3a), state signal Z switches from condition $Z=a_2$ to state $Z=b_2$. A user is therefore notified that he has left the region in which a detected object 122 is located. This information, "no object detected", is generated, in particular, even when measurement signal $U_M$ is above measurement value threshold $U_S$. In this manner, it is possible to locate enclosed objects more accurately than would be the case if only a constant measurement signal threshold were used.

When inventive measuring device 24 is moved further in the direction of arrow 32, measurement signal $U_M$ currently being measured becomes smaller than measurement signal threshold $U_S$ at a position $x_S$. This does not result in a change in state Z, however, since the state and, therefore the output signal, have already been set to $Z=b_2$ ("no object detected").

As measuring device 24 is moved further in arrow direction 32, past position $x_S$, measurement signal $U_M$ passes another local minimum at position $x_{Min2}$ and then increases due to the noticeable influence of another object 123 (see FIG. 3b). In this increase in measurement signal $U_M$, the state is switched from $Z=b_2$ to state $Z=a_3$ ("object detected") when measurement signal $U_M$ currently being measured exceeds threshold value $U_S$. Advantageously, with the inventive method, there is a switch from a state $Z=b$ ("no object detected") to a state $Z=a$ ("object detected") if the most recently measured minimum value of the measurement signal is exceeded by a defined percentage $P_2$, or if the magnitude of measurement signal $U_M$ currently being measured increases beyond a fixed threshold value $U_S$. Since, in the exemplary embodiment in FIG. 3a, threshold value $U_S$ is smaller than the 10% increase in value $U_{Min2}$ of the most recently measured minimum of the measurement signal, the state is switched from $Z=b$ to $Z=a$ when threshold value $U_S$ is exceeded.

When measuring device 24 is slid further in arrow direction 32, measurement signal $U_M$ currently being measured increases, because it is approaching enclosed object 123; at position $x_{Max3}$ it reaches another local maximum, the position of which is identified as the position of enclosed object 123. When the measuring device is moved past position $x_{Max3}$ in arrow direction 32, measurement signal $U_M$ currently being measured decreases as the distance from signal-generating, enclosed object 123 increases. If measurement signal $U_M$ currently being measured falls below the value of previously measured maximum $U_{Max3}$ of the measurement signal by a fixed percentage $P_1$ (e.g., 15% in the exemplary embodiment in FIG. 3a), state $Z=a_3$ switches to state $Z=b_3$ due to the strength of the measurement signal, with is now present. A user is therefore notified that he has once again left the region in which a detected object 123 is located.

Advantageously, second, predefined percentage $P_2$—which serves as a switchover condition from a state $Z=b$ ("no object detected") to a state $Z=a$ ("object detected")—is chosen to be smaller in amount than first, predefined percentage $P_1$, which serves as switchover condition from a state $Z=a$ to a state $Z=b$. Since the percentage is smaller when a minimum value is exceeded than when a maximum value is fallen below, an object can be located much more accurately by moving over it repeatedly than would be possible if the object were moved over once. This relationship is depicted once more in FIG. 4 with reference to an individual object 12.

When the measuring device is moved—starting at start position $x_0$—in the direction of arrow 32 over surface 26 of a wall 34, measurement signal $U_M$ increases initially. If measurement signal $U_M$ currently being measured exceeds a threshold value $U_S$, a state signal Z is generated based on the measurement signal that represents state $Z_1=a$ ("object detected"). A user is therefore notified that an enclosed object 12 has been located. When the measuring device is moved further in the direction of arrow 32, measurement signal $U_M$ currently being measured passes a maximum value at position $x_{Max}$, which is identified as the exact position of enclosed object 12. When the measuring device is moved further, past position $x_{Max}$ and in the direction of arrow 32, over surface 26 of wall 34, measurement value $U_M$ currently being measured decreases compared with maximum value $U_{Max}$, without state $Z_1=a$ first undergoing a change. If measurement signal $U_M$ currently being measured decreases compared to the value of maximum $U_{Max}$ by a predefined percentage $P_1$, i.e., 15% in the exemplary embodiment in FIG. 4, a state signal $Z_1=b$ ("no object detected") is generated based on measurement signal $U_M$. With this, a user is notified that he has left the area in which enclosed object 12 is located.

If the user then changes the direction of motion of the measuring device from arrow direction 32 to arrow direction 33, most recently measured value $U_U$ (reversal point) of measurement signal $U_M$ serves as the minimum value that was measured. If the measuring device is now moved in the direction of arrow 33 once more toward enclosed object 12, state $Z_2=b$ is retained—according to the present invention—until the value of measurement signal $U_M$ currently being measured exceeds a percentage $P_2$ of minimum value $U_U$ measured most recently. In the exemplary embodiment according to FIG. 4, a ten-percent increase compared with minimum value $U_U$ measured most recently is required in order to realize the condition to switchover from state $Z_2=b$ ("no object detected") to state $Z_2=a$ ("object detected"). This signal level is attained at a position $X_2$ in the exemplary embodiment in FIG. 4. That is, when the measuring device is returned in the direction of arrow 33, the lateral range—via which the inventive method communicates the information and signal $Z=a$ ("object detected") to a user—is restricted further.

When the measuring device is now moved further in the direction of arrow 33, measurement signal $U_M$ currently being measured passes a maximum value again, at position $x_{Max}$, and then decreases continually as the measuring device is moved further in the direction of arrow 33. If the value of the measurement signal currently being measured falls below a predefined, fixed percentage $P_1$ of maximum value $U_{Max}$, signal Z is switched from state $Z_2=a$ ("object detected") to a state $Z_2=b$. In the exemplary embodiment in FIG. 4, percentage $P_1$ is 15%, for example, although it can be any value. It is advantageous to note that percentage $P_1$ is chosen to be greater than percentage $P_2$.

Figure 4:
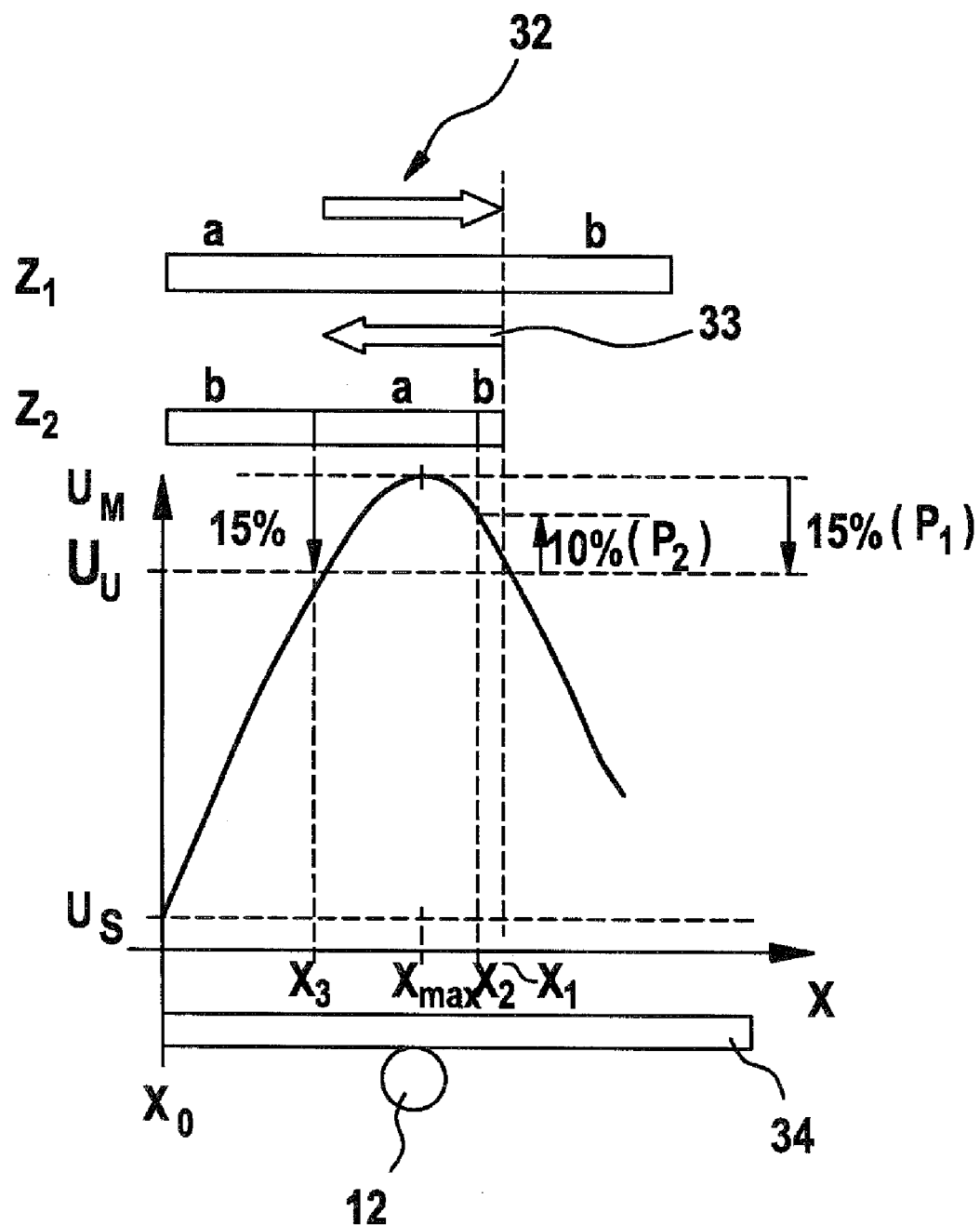
FIG. 4 shows a detailed depiction of the measurement signal graph and the state signal derives therefrom in the immediate vicinity of an object to be located, in a schematicized depiction.

As shown in FIG. 4, the range over which enclosed object 12 is located ($Z_2=a$) when returning in the direction of arrow 33 is greatly restricted compared with original range $Z_1=a$, over which the object was detected when the measuring device was first moved in arrow direction 32. If—at position $X_3$, at which there was a switch from the state "object detected" ($Z_2$=a) to the state "no object detected" ($Z_2$=b)—a user changes the direction of motion again and moves the measuring device in the direction of arrow 32 again over object 12 to be located, the range across which signal $Z_3$=a is output is restricted once more, according to the present invention, compared with range $Z_2$=a.

Using the inventive method, a user is therefore capable of locating the exact position of an enclosed object (position $x_{Max}$ in FIG. 4) without knowing the exact course of measurement signal $U_M$. It is possible to locate an enclosed object with much greater accuracy due solely to the inventive signals regarding the state of the system (Z=a) "object detected", and the state (Z=b) "no object detected", and particularly due to the different magnitude of the switchover conditions $P_1$ and $P_2$ for switching the particular state. For example, a measuring device can only guarantee that signal Z will be output yet still make it possible to locate enclosed objects exactly. With alternative measuring devices, signal Z and measurement signal $U_M$ can be output.

Figure 5:
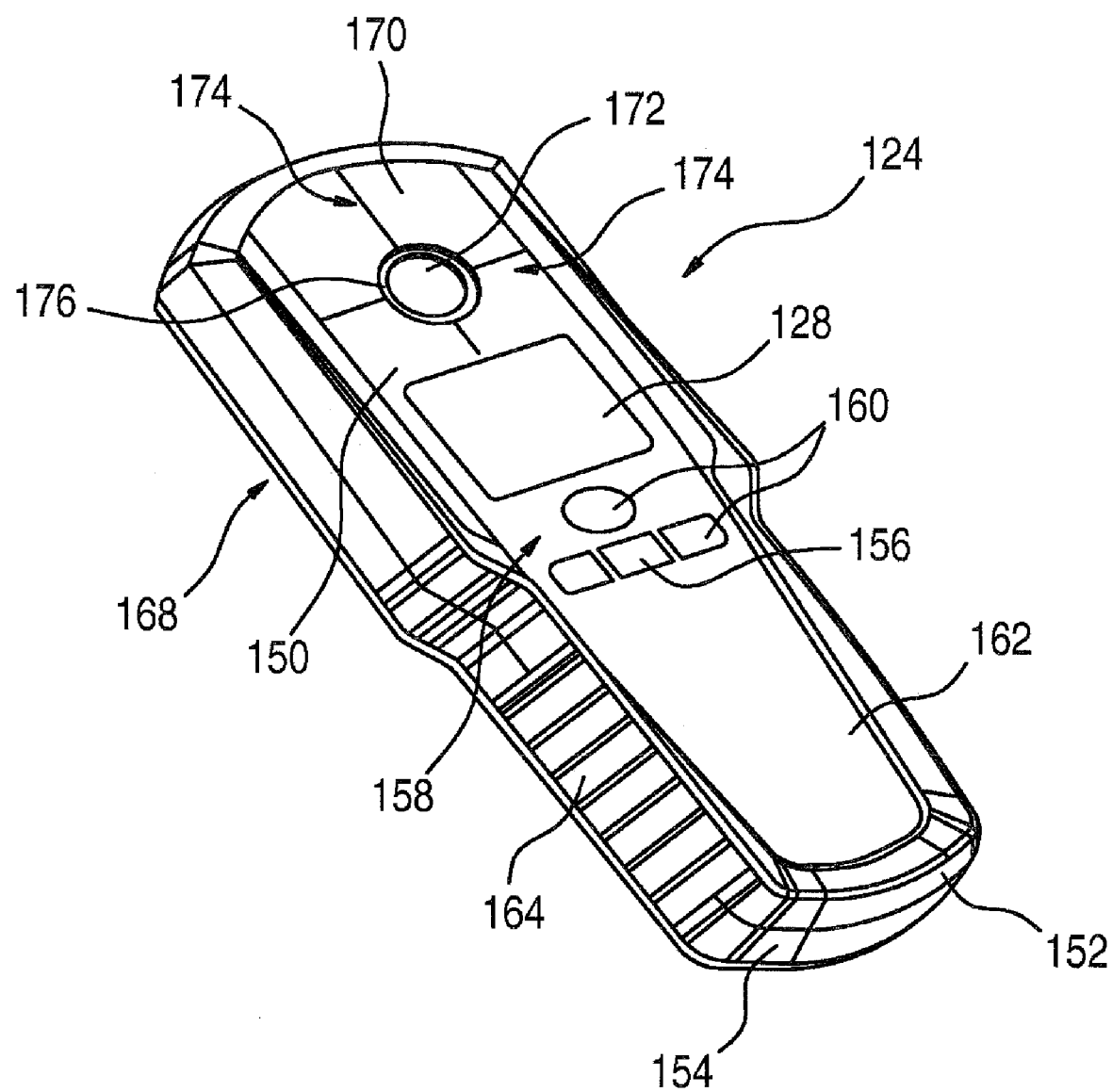
FIG. 5 shows a perspective view of a possible exemplary embodiment of an inventive measuring device.

FIG. 5 shows a possible exemplary embodiment of an inventive measuring device, particularly a hand-held locating device, according to the inventive method.

FIG. 5 shows an inventive measuring device 124 in a perspective overview. The measuring device includes a housing 150, which is composed of a top half shell 152 and a lower half shell 154. At least one sensor with a receiving conductor loop system, e.g., a coil configuration, is provided inside the housing. Further sensors, e.g., inductive or capacitive sensors, can also be integrated in measuring device 124. Signal generation and evaluation electronics, and an energy supply, e.g., batteries or rechargeable batteries, are also located inside measuring device 124. The measuring device shown in FIG. 5 also includes a display 128 for outputting an output signal correlated with the measurement signal. Via display 128, e.g., a segmented bar display or a graphical display using an LCD, it is possible to depict the intensity of detected measurement signal $U_M$.

The inventive measuring device also includes a control panel 158 with a row of control elements 160 that make it possible to turn the device on or off, or to start a measurement or calibration procedure. Using control element 156, for example, it can be possible for a user to vary the frequency of the measurement signal. It can also be provided that this variation of the measurement frequency is carried out automatically by the device and, in particular, that it is not accessible by the user.

In the region below control panel 158, the measuring device according to FIG. 5 includes a region 162, which is designed—via its shape and material—as handle 164 for guiding the inventive measuring device. Using handle 164, the measuring device is guided via its underside—which is opposite to the observer of FIG. 5—along a surface of an object or a medium to be investigated, such as surface 26 of a wall 10 shown schematically in FIG. 3.

Measuring device 124 has an opening 172 that penetrates the housing on side 170 of measuring device 124 opposite to handle 164. Opening 172 is located concentrically with receiving conductor loop system 134 of the sensor, at the least. In this manner, the location of opening 172 in the measuring device matches the center of the locating sensor, thereby ensuring that the exact position of an object to be detected is also displayed simultaneously to the user of a device of this type. On its top side, the measuring device also includes marking lines 174, via which the user can locate the exact center of opening 172 and, therefore, the position of an enclosed object. Opening 172 is enclosed by a semi-transparent sleeve 176, into which the light from different light-emitting diodes can be directed. If the measuring device detects a measurement signal $U_M$, based on which a state signal Z=a is generated using the method described, i.e., an object was located, the sleeve can be illuminated red, for example, in order to communicate to the user that an object has been located where opening 172 is, and he should therefore avoid drilling a hole at this point. If, with the inventive method, a signal with state Z=b is generated, a green light can be directed into the sleeve, e.g., to signal to a user that an object has not been located, and he can, e.g., drill a hole in the region of opening 172 of the measuring device.

In alternative embodiments of an inventive measuring device, state Z can also be depicted directly using output means, e.g., light-emitting diodes, which are visibly located in or on the housing of the measuring device.

It is also possible and advantageous to integrate a sensor according to the inventive method directly or as an add-on part in a machine tool, e.g., in a drilling tool, to enable a user to work confidently with this machine.

The inventive method and a measuring device that operates using this method are not limited to the exemplary embodiment depicted in the Figures.

In particular, the inventive method is not limited to the use of only one transmission coil and/or a receiving conductor loop system. Multifold systems are also possible. A locating device could also include, e.g., a compensation sensor. A sensor of this type includes, e.g., three coils. A first transmission coil is connected to a first transmitter, a second transmission coil—if present—is connected to a second transmitter, and a receiving conductor loop system that serves as a receiving coil is connected to a receiver. The two transmission coils are supplied with alternating currents of a frequency $f_M$ and opposed phase by their transmitters. The first transmission coil induces a flux in the receiving coil, which is oriented in the opposite direction from the flux induced in the receiving coil by the second transmission coil. The two fluxes induced in the receiving coil therefore compensate each other. As such, the receiver does not detect a received signal in the receiving coil if an external, metallic object is not located near a coil assembly of this type. Flux $\phi$ excited by the individual transmission coils in the receiving coil depends on various quantities, e.g., the number of windings and the geometry of the coils, and on the amplitudes of the currents supplied to the two transmission coils, and on the mutual phase angle of these currents. With detectors of these types, these quantities must ultimately be optimized so that the least amount of flux $\phi$ possible is excited in the receiving coil if a metallic object is not present.

As an alternative, it is also possible to use only one transmission coil and to position the receiving winding system three-dimensionally such that no voltage is induced when there are no metallic objects present in the receiving conductor structures.

It is also possible to combine several sensors in one measuring device.

What is claimed is:

1. A method for locating objects enclosed in a medium, comprising the steps of generating a measurement signal correlated with an enclosed object; using the generated measurement signal to produce a signal which represents a difference between at least a first state which is "object detected" and at least a second state which is "no object detected"; switching from the first state "object detected" to the second state "no object detected" if a magnitude of the measurement signal being measured currently falls below a previously measured local maximum value of the measurement signal by a predefined first percentage.

2. A method as defined in claim 1, further comprising as an alternative, switching from the first state "object detected" to the second state "no object detected" if the magnitude of the measurement signal being measured currently falls below a predefined first threshold value, but without having fallen below the local maximum value of the measurement signal by the predefined first percentage.

3. A method as defined in claim 2, further comprising as an alternative, switching from the second state "no object detected" to the first state "object detected" if the magnitude of the measurement signal being measured currently exceeds a predefined second threshold value, but without having exceeded the local minimal value of the measurement signal by a predefined second percentage.

4. A method as defined in claim 3, further comprising providing the first threshold value equal to the second threshold value.

5. A method as defined in claim 1, further comprising switching from the second state "no object detected" to the first state "object detected" if the magnitude of the measurement signal being measured currently exceeds a previously measured local minimum value of the measurement signal by a predefined second percentage.

6. A method as defined in claim 5, further comprising choosing the predefined first percentage to be greater than the predefined second percentage.

7. A method as defined in claim 1, further comprising measuring the measurement signal as a function of a lateral displacement of a sensor.

8. A measuring device for carrying out the method as defined in claim 1, the measuring device comprising output means for depicting a state that is measured.

9. A measuring device as defined in claim 8, wherein said output means is configured so that they depict the state optically.

10. A measuring device as defined in claim 8, further including at least one sensor with at least one receiving conductor loop system.

11. A measuring device as defined in claim 8, wherein the measuring device is configured as a hand-held locating device.

* * * * *